United States Patent
Koopmans et al.

(10) Patent No.: US 8,429,169 B2
(45) Date of Patent: Apr. 23, 2013

(54) SYSTEMS AND METHODS FOR VIDEO CACHE INDEXING

(75) Inventors: Frederick Koopmans, Sunnyvale, CA (US); Miguel Melnyk, Champaign, IL (US); Reuben Balik, Champaign, IL (US)

(73) Assignee: Bytemobile, Inc., Santa Clara, CA (US)

(*) Notice: Subject to any disclaimer, the term of this patent is extended or adjusted under 35 U.S.C. 154(b) by 0 days.

(21) Appl. No.: 13/194,837

(22) Filed: Jul. 29, 2011

(65) Prior Publication Data

US 2012/0030212 A1      Feb. 2, 2012

Related U.S. Application Data

(60) Provisional application No. 61/369,513, filed on Jul. 30, 2010.

(51) Int. Cl.
*G06F 17/30* (2006.01)

(52) U.S. Cl.
USPC ............. 707/741; 707/694; 707/E17.085

(58) Field of Classification Search .......... None
See application file for complete search history.

(56) References Cited

U.S. PATENT DOCUMENTS

| | | |
|---|---|---|
| 2002/0169926 A1 | 11/2002 | Pickney, III et al. |
| 2002/0178169 A1* | 11/2002 | Nair et al. ............ 707/100 |
| 2005/0125533 A1* | 6/2005 | Svanbro et al. ........ 709/225 |
| 2005/0165828 A1 | 7/2005 | Lango et al. |
| 2006/0168318 A1* | 7/2006 | Twiss ............... 709/238 |
| 2007/0204057 A1 | 8/2007 | Shaver et al. |
| 2011/0058675 A1* | 3/2011 | Brueck et al. ......... 380/277 |

OTHER PUBLICATIONS

PCT Notification of Transmittal of the International Search Report and the Written Opinion of the International Searching Authority, mailed Oct. 21, 2011 in corresponding International Application No. PCT/US2011/046033, Bytemobile, Inc., 12 pages.

* cited by examiner

*Primary Examiner* — Anteneh Girma
(74) *Attorney, Agent, or Firm* — Finnegan, Henderson, Farabow, Garrett & Dunner LLP (57) ABSTRACT

Methods and systems for indexing content in a cache data structure within a content cache are disclosed. The methods and systems identify at least one characterization data associated with a received content request and input the at least one characterization data into a hash function to generate an index that is used for identifying an entry associated with the requested content in the cache data structure. The at least one characterization data may include a portion of content associated with the received content request, a portion of a Uniform Resource Locator (URL) associated with the received content request, an IP address associated with the received content request, the length of the content associated with the received content request, and one or more parameters parsed from the URL associated with the received content request.

23 Claims, 6 Drawing Sheets

SYSTEMS AND METHODS FOR VIDEO CACHE INDEXING

PRIORITY

This application claims the benefit of U.S. Provisional Application No. 61/369,513, filed Jul. 30, 2010, the subject matter of which is incorporated herein by reference.

FIELD

The present disclosure is directed to the field of web content delivery and more particularly to systems and methods for caching video content more efficiently.

BACKGROUND

Over the last ten years, the number of computing devices that are capable of rendering video to users has increased tremendously. Not long ago, a user needed a high-end personal computer or computer workstation to render digital video at an acceptable frame rate. Today, improvements in video graphics hardware technology have made video rendering available to the masses. Internet-connected devices are now capable of rendering video at a quality level that is acceptable to many users.

During this same time period, broadband Internet service has become widely available. Users with broadband Internet service can download large amounts of data, including video, to their Internet-connected devices at very low cost. Once a user begins downloading a large video file, streaming technology built into programs for viewing digital video allows users to view the beginning of the video while later portions of the same video are still being downloaded. Together, these technical innovations have greatly increased users' appetites for downloading video content.

Additionally, in the last few years, specialized hardware and software for generating digital video has become much more accessible to average consumers. Many inexpensive digital cameras are capable of capturing segments of digital video and some specialized but inexpensive devices are even capable of capturing high definition digital video that can be readily uploaded to the Internet. These technical and economic innovations have dramatically increased users' abilities to produce downloadable video content. Many popular websites cater to such interests by providing an easy means for users to upload their videos and make them publicly available for others to view, thereby creating a very public venue for self expression. These developments have led to an explosion in consumer interest for video content delivered over the Internet.

At present, websites deliver millions of hours of video content to hundreds of millions of users each month. Some popular websites, such as YouTube™ (www.youtube.com), are entirely focused on delivering video content to users. Other popular websites, such as CNN™ (www.cnn.com), supplement traditional news and non-video content with short video clips or segments of special interest. Consumer interest in video content is so great that few popular websites have remained popular while providing no video content whatsoever.

Notwithstanding the many websites that deliver enormous amounts of video content online to users, delivery of video content is still an expensive proposition. Delivering large video content files over the Internet tends to place a substantial processing load on the network infrastructure communicating such content as well as web servers transmitting such content to users (relative to delivering text or static image content). This burden is especially great on network infrastructures employing wireless technology, since wireless networks generally offer lower communication throughput than wired networks and wireless networks generally suffer from greater packet loss and location-dependent throughput than wired networks.

For example, a typical still image rendered within a webpage may be 200 Kilobytes in length and a full-length text article may be 10 Kilobytes in length. By contrast, a five-minute video segment may be anywhere from several Megabytes to 100 Megabytes or more, depending on the content and resolution of the video as well as the compression technology used to encode the video. Since network bandwidth and web server capacity are finite, and additional network bandwidth and web server capacity can be expensive to a video content provider, larger video files burden a network and web server infrastructure more than smaller text or still image content.

As a result of this burden, fewer users can be served by the network and web server infrastructure when serving video content relative to the number of users that can be served by the same network and web server infrastructure delivering text or still image content. Thus, companies that seek to appeal to a large user community either face increasing their content delivery capacity or risk losing users if their website seems slow due to overloaded web servers or an overloaded network infrastructure. Since customer loss can be fatal to a web business, most companies opt to increase their content delivery capacity as their customer base grows.

Figure 1:
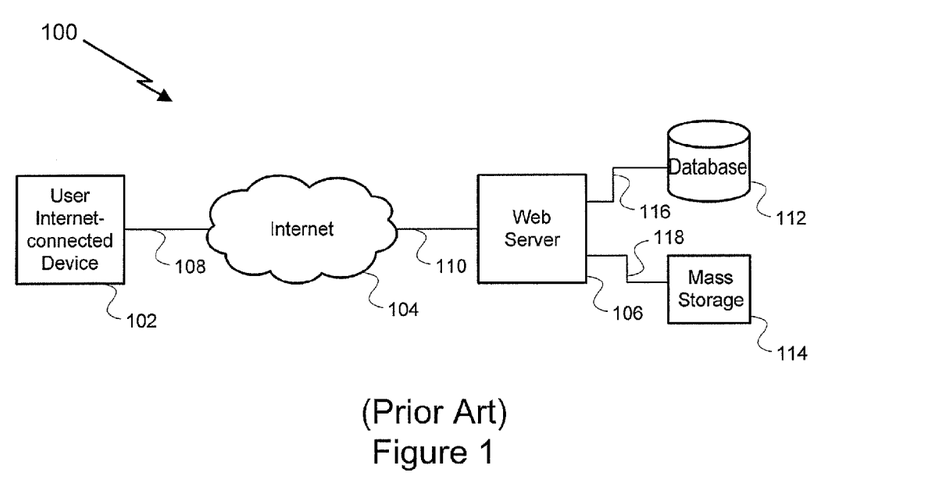
FIG. 1 illustrates a prior art system capable of delivering video content to users utilizing Internet-connected devices.

FIG. 1 illustrates a prior art system 100 capable of delivering video content to users utilizing Internet-connected devices. As shown, system 100 comprises user Internet-connected device 102, Internet 104, web server 106, database 112, and mass storage 114. User Internet-connected device 102 is coupled to Internet 104 through network connection 108. Web server 106 is coupled to the Internet 104 through network connection 110. Web server 106 is coupled to database 112 and mass storage 114 through couplings 116 and 118, respectively.

Generally, system 100 operates as follows: A user makes a request to view content on their Internet-connected device from a website served by hardware and software configured to respond to that request, shown collectively in FIG. 1 as web server 106, database 112, and mass storage 114. The user makes such a request by initiating a content request through user Internet-connected device 102, which transmits the content request through network connection 108, Internet 104, and network connection 110 to web server 106.

Upon receiving the content request, web server 106 determines which file stored in mass storage 114 corresponds to the requested content. Data relating to this correspondence, as well as other data relating to how many times each video has been requested and which content files are popular, may be stored in database 112. Once web server 106 has identified the file stored in mass storage 114 that corresponds to the requested content, web server 106 retrieves that file from mass storage 114 and transmits the file to user Internet-connected device 102 through the aforementioned series of network connections. Upon receiving the requested content from web server 106, user Internet-connected device 102 may render the requested content in a web browser or other video rendering software application.

Although the system illustrated in FIG. 1 merely shows a single user Internet-connected device and a single web server, more complex systems are readily apparent. For example, a large number of users may attempt to access a particular website through their respective Internet-connected devices within a short period of time. If the number of concurrent users is sufficiently large, the requests made by those users may exceed the response capacity of a single web server or of the network infrastructure.

Some middleware services provide content caching between user Internet-connected devices and web servers. These middleware services may also optimize the content prior to transmitting it to the user Internet-connected device so that faster download times may be achieved by the user Internet-connected device. Employing a middleware service to optimize and deliver content while still relying on a web server to dynamically generate webpages and perform complex processing can allow the combination of a web server and a middleware service to serve more users, for a given network infrastructure, than a web server without a middleware service.

Although the benefits of a middleware service are apparent, many popular websites serving video content are unable to benefit from conventional content caching because these websites utilize "dynamic URLs" to refer to video content. Dynamic URLs represent a "link" (i.e., a reference) to video content, where the link is only valid under certain conditions. One such condition can be that the referenced content is referenced within a specific period of time. Another such condition can be that only certain users may reference that content. Yet another such condition may be that only users in certain geographic regions can reference that content. Other conditions are possible.

If conditions imposed on viewing a particular piece of video content through a particular dynamic URL are not met, video content referenced by the dynamic URL is not available to the requesting user by that user referencing the dynamic URL. Instead, the video content provider may reject the user's request to access the particular piece of video content through the particular dynamic URL by displaying an "access denied" or "content not found" message. The same video content, however, may still be available through another dynamic URL if the conditions imposed on viewing the particular piece of video content through that other dynamic URL, such as time or geographic conditions discussed above, are met. The same video content may also be concurrently available through more than one dynamic URL at any given time.

Caching of video content referenced by dynamic URLs can lead to at least two inefficiencies in a middleware service that caches content. Both of these inefficiencies are related to indexing cached content based at least in part on the (dynamic) URL for the content.

First, use of dynamic URLs may lead to multiple cache entries corresponding to the same video content within the content cache, thereby reducing the capacity of the content cache to serve other, unique content to users. In this scenario, the content cache contains valid but redundant information, thereby reducing the efficiency of the content cache.

Second, use of dynamic URLs may lead to content cache entries with expired references to content, again reducing the useful capacity of the content cache. In contrast to the first scenario, this second scenario involves the content cache containing invalid information, rather than valid but redundant data. Therefore, for at least the reasons stated above, middleware services employing a content cache indexed at least in part by dynamic URLs provide inefficient solutions to website performance issues.

DETAILED DESCRIPTION

The systems and methods described herein cache video content by indexing the content cache based on a characterization of the video content rather than indexing the content cache by the URL of the content. Unlike prior art industry practice, this approach allows video content to be more efficiently cached even when that content is referenced using a dynamic URL. This approach also allows two videos that are similar but not identical to be distinguished by the indexing scheme, thereby avoiding a user Internet-connected device requesting a first video but the cache delivering a second (similar but not identical) video (a condition sometimes referred to as "content aliasing").

Specifically, the content cache described herein is intelligently responsive to content requests where more than one dynamic URL simultaneously refers to a piece of content; only a single copy of the content is indexed in the content cache notwithstanding the various dynamic URLs employed to refer to that content. Additionally, expiration of dynamic URLs does not necessarily lead to orphan entries in the content cache; content referred to by a new, unexpired dynamic URL can be served from the content cache based on a copy previously stored in the content cache and referred to by a dynamic URL that has since expired.

Thus, the described systems and methods for caching video content allow the content cache to efficiently cache video content, even in the presence of dynamic URLs, thereby reserving the web server for processing tasks that benefit from the sophisticated software and hardware capabilities of that web server.

Each entry in the content cache comprises at least a field for an index and a field for referencing the cached content. In some embodiments, each reference to cached content may be a directory name and file name for that cached content. In other embodiments, each reference to cached content may be another means of identifying cached content, such as a string that uniquely identifies the cached content. In some embodiments, the content cache is a data structure stored in main or secondary memory within the content cache. In other embodiments, the content cache may be comprised of data stored in a file or database table within the content cache or stored in a file or database table on a file or database server external to the content cache.

In some embodiments, the reference to cached content refers to a file stored on mass storage within the content cache. In other embodiments, the reference to cached content may refer to content stored on a mass storage unit, such as a hard disk, external to the content cache.

Figure 2:
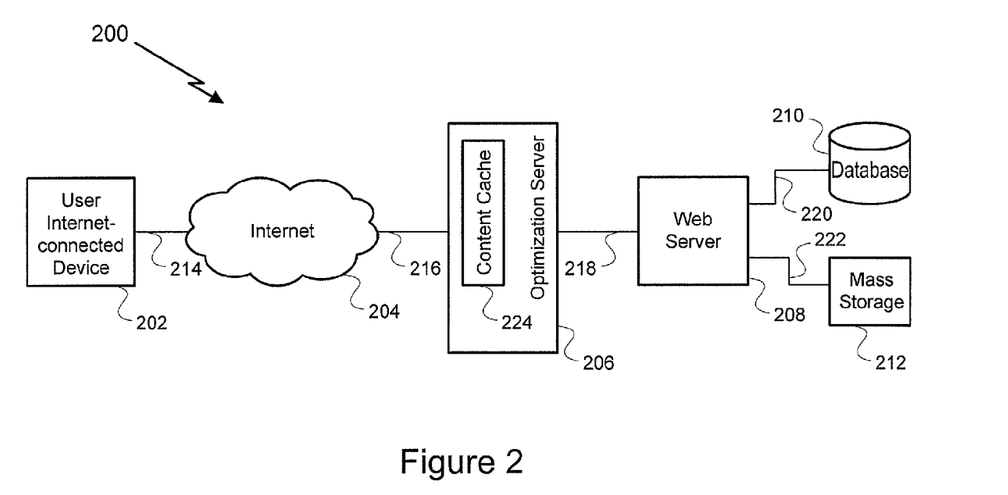
FIG. 2 illustrates an example system that employs a content cache to reduce the burden on the network infrastructure and a web server.

FIG. 2 illustrates a system 200 that employs an optimization server 206 including content cache 224 to reduce the burden on the network infrastructure and on web server 208. As shown, the system 200 comprises user Internet-connected device 202, Internet 204, optimization server 206, web server 208, database 210, and mass storage 212. User Internet-connected device 202 may be a laptop computer, cellular telephone, personal data assistant, tablet, or any other type of computing device that is portable and capable of rendering video. User Internet-connected device 202 is coupled to Internet 204 through network connection 214. Optimization server 206 is coupled to Internet 204 through first network connection 216. Optimization server 206 is also coupled to web server 208 through second network connection 218. Web server 208 is optionally coupled to database 210 and mass storage 212 through couplings 220 and 222, respectively. In some embodiments, web server 208 retrieves content and data from database 210, which is coupled to web server 208, rather than retrieving content or data from mass storage 212. In this embodiment, mass storage 212 may not be present in system 200. In other embodiments, web server 208 retrieves content and data from mass storage 212, which is coupled to web server 208, rather than retrieving content or data from database 210. In this embodiment, database 210 may not be present in system 200. In still-other embodiments, web server 208 retrieves content and data from a combination of mass storage 212 and database 210. In this embodiment, web server 208 and database 210 are both present in system 200 and coupled to web server 208. In some embodiments, optimization server 206 includes content cache 224 (as shown in FIG. 2). In other embodiments (not shown), content cache 224 is external to optimization server 206, and content cache 224 is coupled to optimization server 206.

Generally, system 200 operates as follows: A user makes a request to view content from a website served in part by middleware shown in FIG. 2 as optimization server 206, and also in part by web server 208, database 210, and mass storage 212. The user makes such a request by initiating a content request through user Internet-connected device 202, which transmits the content request to optimization server 206 through network connection 214, Internet 204, and network connection 216.

Upon receiving the content request, optimization server 206 ascertains whether the requested content is stored in content cache 224. If the requested content is stored in content cache 224, optimization server 206 determines whether a version of the requested content at a quality level that is appropriate for the requesting user is stored in content cache 224. If a version of the requested content at the appropriate quality level is stored in content cache 224, optimization server 206 transmits that version of the requested content to user Internet-connected device 202 through the aforementioned network connections.

If the requested content is stored in content cache 224 in its original (unoptimized) format but is not stored there at a quality level appropriate for the user, optimization server 206 creates an optimized copy of the requested content at the appropriate quality level, stores that optimized copy of the requested content in content cache 224, and transmits the optimized copy of the requested content to user Internet-connected device 202. Creating an optimized copy of the requested content involves optimizing the requested content, in original format, to create a copy of the requested content at the appropriate quality level for the user. After creating an optimized copy of the requested content, the requested content in original format remains in the content cache for possible future use in creating other copies of the requested content at quality levels appropriate to future requesting users.

If the requested content is neither stored in content cache 224 at the appropriate quality level for the user nor stored there in its original format, optimization server 206 executes a sequence of steps that may include: (1) communicating the content request to web server 208; (2) receiving the requested content, in original format, from web server 208; (3) storing a copy of the requested content, in original format, in content cache 224 for future use; (4) creating and storing a copy of the requested content at the appropriate quality level for the user, as described above, and (5) transmitting the requested content at the appropriate quality level to user Internet-connected device 202. Upon receiving the content request from optimization server 206, web server 208 may employ mass storage 212 or database 210, or both, to serve the request content depending on how web server 208 stores and indexes its content.

Figure 3:
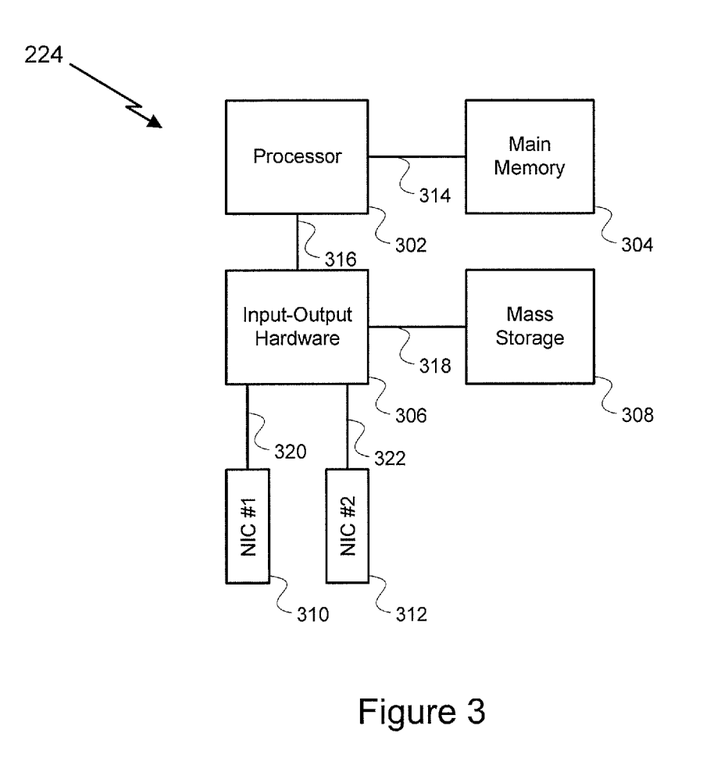
FIG. 3 illustrates the components of an example content cache.

FIG. 3 illustrates the components of exemplary content cache 224. As shown, content cache 224 includes a processor 302, a main memory 304, an input-output hardware 306, a mass storage 308, and network interface cards (NICs) 310 and 312. Processor 302 is coupled to main memory 304 through memory bus 314. Processor 302 is also coupled to input-output hardware 306 through input-output bus 316. Input-output hardware 306 is coupled to mass storage 308, NIC 310, and NIC 312 through couplings 318, 320, and 322, respectively. Main memory 304 can be composed of random access memory ("RAM"), read-only memory ("ROM"), FLASH memory, any combination thereof, or any type of memory.

Generally, content cache 224 operates as follows: Main memory 304 is encoded with instructions that, when executed by processor 302, are operable to receive content requests from a user Internet-connected device through NIC 310, determine whether the requested content is present in mass storage 308, and transmit the requested content to the user computer through NIC 310 if the requested content is currently stored in mass storage 308. Main memory 304 is also encoded with instructions that forward a content request whose corresponding content is not currently stored in mass storage 308 to a web server (e.g., web server 208) through NIC 312, receive requested content in original format from web server 208 through NIC 312, create a copy of the requested content at an appropriate quality level for the user, store the requested content in original format and at an appropriate quality level in mass storage 308, and forward the requested content at an appropriate quality level for the requesting user Internet-connected device through NIC 310. In some embodiments, the instructions in main memory are stored on a computer-readable medium, such as a hard disk, optical disc (including but not limited to CD or DVD discs), floppy disk, FLASH memory disk, or solid state disk ("SSD"), prior to being stored in main memory.

Determinations of whether requested content is stored in the content cache 224 are made by checking a cache data structure for an indication that it stores a reference to the requested content. This cache data structure is comprised of a series of entries, where each entry further comprises an index field and a content reference field. The content cache determines that a reference to requested content is stored in the content cache by comparing an "index" generated from the requested content to the index field within each entry of the cache data structure. If a match exists between the index generated from the requested content and an index field within an entry of the cache data structure, the content referenced by the content reference field within the entry of the cache data structure whose index field matched the generated index is returned to the requesting user Internet-connected device.

In some embodiments, the cache data structure is stored in main memory 304. In other embodiments, the cache data structure may be stored in secondary memory within the content cache (not shown), in a file stored on the content cache or on an external disk, in database table stored within the content cache, or in a database table stored on a database server external to the content cache. A more specific description of the operation of the content cache follows.

Figure 4A:
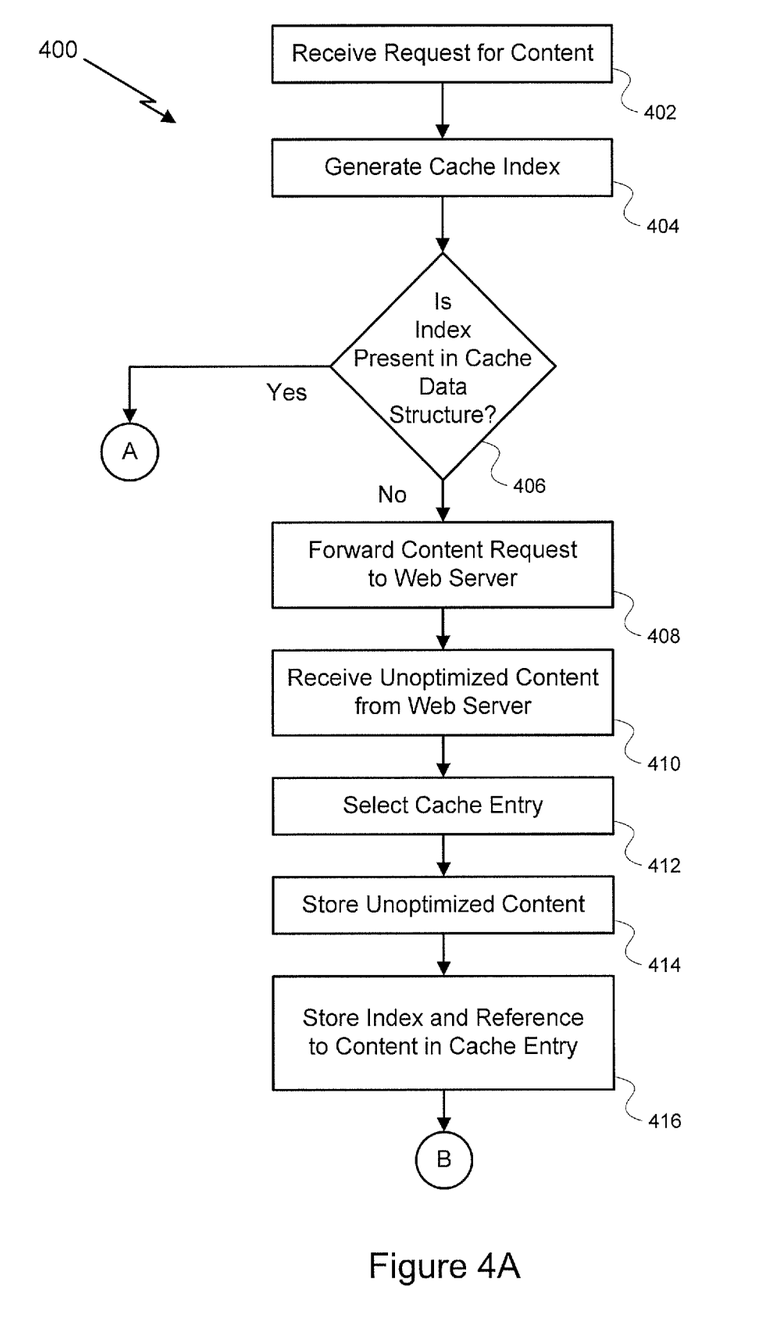
FIGS. 4A & 4B illustrate an example method for serving content requests from a content cache at an appropriate quality level.
Figure 4B:
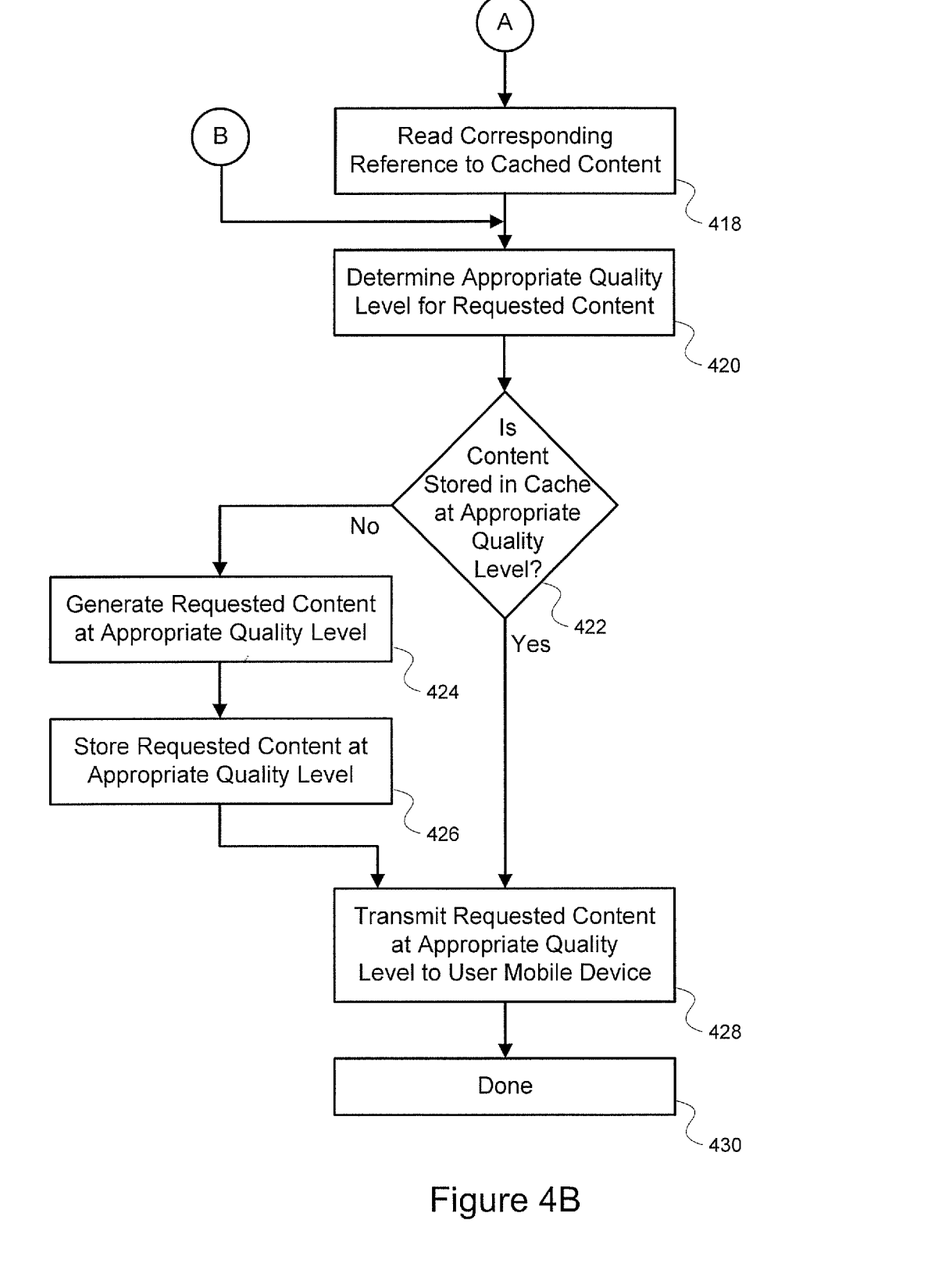

FIGS. 4A & 4B illustrate an example method 400 for serving content requests from a content cache at an appropriate quality level. While method 400 discloses the following steps in a particular order, it is appreciated that at least some of the steps can be reordered, modified, or deleted where appropriate.

As illustrated, method 400 begins by receiving a content request from a user Internet-connected device in step 402. After receiving the content request, a determination is made whether the requested content is present in the content cache. In step 404, a cache index is generated for comparison to cache indexes within entries of a cache data structure. In one embodiment, a cache index is generated using a hash algorithm and at least one type of characterization data, as discussed below in conjunction with the method of FIGS. 5A and 5B. In step 406, the generated cache index is compared to the cache index field in each entry of the cache data structure, to determine whether the generated cache index is present in the index field of any entry in the cache data structure.

If the check performed in step 406 determines that the generated cache index was not present within the index field of any entry in the cache data structure, the content cache forwards the content request to a web server, receives the requested content in unoptimized form from the web server, and stores the requested content in the content cache as discussed below. In step 408, the content request is forwarded to the web server. In step 410, the content cache receives the requested content from the web server, albeit in unoptimized form (i.e., in the form that the requested content is stored on the web server, rather than in a form representing an appropriate quality level for the user Internet-connected device). In step 412, an entry within the cache data structure is selected for storing the index corresponding to the requested content and a reference to the requested content. Any means can be used for selecting which entry within a cache to overwrite with new data. Such means include a least-recently-used selection policy, among others.

In step 414, the requested content, in unoptimized form, is stored in mass storage within the content cache. In step 416, the index and reference to the requested content are stored in the cache data structure entry selected in step 412. Thereafter, the method continues by generating a copy of the content at an appropriate quality level and transmitting that copy of the content (at the appropriate quality level) to the user Internet-connected device, as discussed below beginning with step 420.

Returning now to step 406, if the check performed in step 406 determined that the generated cache index was present within the index field of an entry within the cache data structure, the method continues to step 418. In step 418, the content cache reads the content reference field stored in the entry of the cache data structure whose index field matches the generated cache index.

In step 420, the content cache determines what quality level is appropriate for the requested content, given the characteristics of the content request. Such characteristics may include the resolution of the screen on the requesting device, and the throughput of the network connection between the requesting device and the Internet, as discussed in further detail below. Other characteristics can also be considered. In step 422, the content cache determines whether the requested content is presently stored in the content cache at the appropriate quality level.

If step 422 determines that the requested content is not stored in the content cache at the appropriate quality level, the content cache generates the requested content at the appropriate quality level in step 424 and stores the requested content at the appropriate quality level in mass storage within the content cache in step 426. After step 426, the method continues to step 428.

If, however, step 422 determines that the requested content is presently stored in mass storage within the content cache at the appropriate quality level, the method continues to step 428. In step 428, the content cache transmits the requested content, at the appropriate quality level, to the user Internet-connected device. Thereafter, the method concludes in step 430.

As previously discussed, however, caching systems are subject to inefficiencies when cached content is identified by dynamic URLs. These inefficiencies can be avoided by characterizing each piece of content and storing that characterization result as an index to a content cache entry that corresponds to the piece of content. Each time a piece of content is requested from the content cache, a portion of the requested content is retrieved by the content cache from the web server and characterized to create an index for comparison to the indexes in each cache data structure entry (corresponding to each piece of content stored in the content cache).

If a match exists between the index generated by characterizing the portion of the requested content retrieved from the web server and an index stored in the cache data structure, the requested content is present in the content cache, at least in original format but also possibly at the requested quality level; accordingly, the cached content corresponding to the index in the cache data structure that matched is translated to the requested quality level, if necessary, and transmitted to the user Internet-connected device.

If no match exists between the index generated by characterizing the portion of the requested content retrieved from the web server and the indexes stored in the cache data structure, the content cache does not presently contain the requested content, in original format or at the appropriate quality level; accordingly, the content cache forwards the content request to the web server, receives the requested content in original format from the web server, optimizes the requested content to create a copy of the requested content at the appropriate quality level, stores the requested content in original format and the content at the appropriate quality level for future use (using the characterization result to index the requested content in the cache data structure) within the content cache, and forwards the requested content at the appropriate quality level from the content cache to the requesting user Internet-connected device, as previously discussed in conjunction with the method 400.

Constructing an index involves a characterization process being performed. The characterization process takes at least one form of data relating to a piece of content, each form referred to herein as "characterization data," inputs the at least one characterization data into a hash algorithm to produce a unique hash result, and stores that unique hash result as the index in the cache data structure for the corresponding piece of content.

In some embodiments, the hash algorithm is capable of receiving multiple inputs of varying length and producing a single, unique output of fixed length. The hash algorithm utilized for constructing an index can be any type of hash algorithm. For example, the hash algorithm can be the SHA2

(secure hash algorithm, second generation) algorithm, a version of which produces a 256-bit output.

One or more inputs to the hash algorithm may be selected. Selecting appropriate inputs to the hash algorithm may allow the content cache to uniquely identify cached content, such that a computationally inexpensive characterization can be performed, in real time, on each requested piece of content while minimizing or eliminating any possibility of a single characterization result corresponding to more two or more substantially different pieces of content (i.e., "content aliasing"). This concept supports the notions of avoiding duplicate content in the content cache, for efficiency purposes, and avoiding content aliasing.

In some embodiments, at least one type of characterization data for each piece of content is utilized as an input to the hash algorithm for that piece of content. The characterization process can also be customized, based on configuration data stored in a configuration file or a database, to acquire characterization data differently for different websites, based on file format or URL format differences between various websites, or to use greater or fewer pieces of data to generate the characterization. Indeed, caching of requested content can even be disabled entirely for certain websites, if appropriate, based on settings in the configuration file or configuration database. Taken together, as inputs to the hash algorithm, the at least one type of characterization data represents a reliable indicator of uniqueness for the corresponding content, thereby producing a unique characterization result from the hash algorithm. Each type of characterization data is described in the discussion of FIGS. 5A and 5B that follows.

Figure 5A:
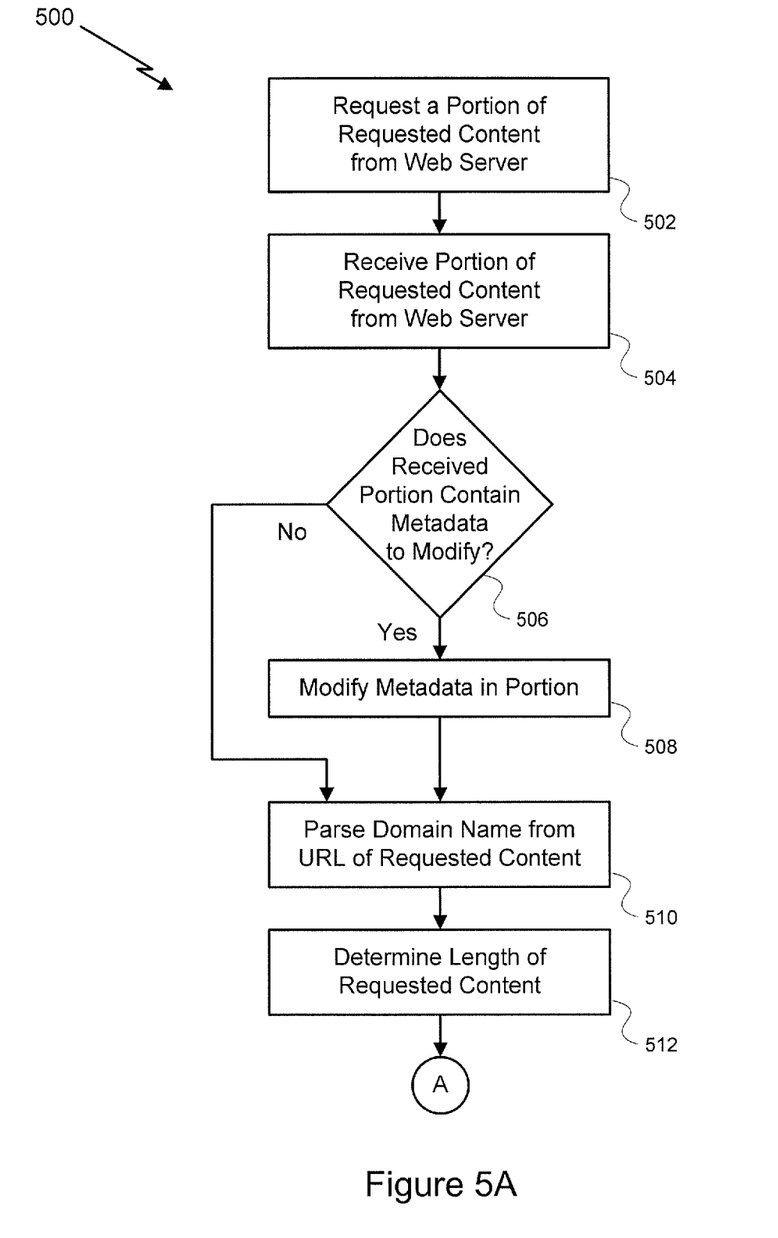
FIGS. 5A & 5B illustrate an example method for generating an index into a content cache using one or more types of characterization data.
Figure 5B:
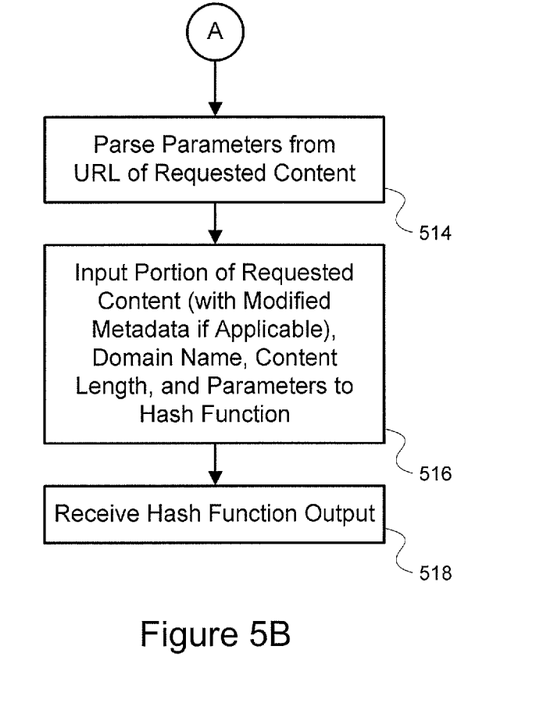

FIGS. 5A and 5B illustrate an example method 500 for generating an index into a content cache using one or more types of characterization data. While method 400 discloses the following steps in a particular order, it is appreciated that at least some of the steps can be reordered, modified, or deleted where appropriate.

A first type of characterization data that can be used as an input to the hash algorithm is a portion of the requested content. As illustrated in FIG. 5A, method 500 begins in step 502 by requesting a fixed portion of requested content from a web server. In step 504, a fixed portion of requested content is received from the web server by the content cache. By using an actual portion of the requested content to characterize that content, aliases between similar videos or the same video encoded in two different encoding formats can be avoided. The length of the portion of the requested content to be used for characterization purposes should be long enough to uniquely identify the content.

In some embodiments, the length of the portion to be used as an input to the hash algorithm may be set through a configuration file parameter stored within the content cache. In other embodiments, the portion length may be set by a value stored in a database. In some embodiments, the portion of the requested content for characterization purposes is the first 45 Kilobytes of that requested content. In other embodiments, a different length portion of the requested content can be characterized for some or all websites or different portion lengths can be characterized for different file formats (e.g., characterization of FLASH files can use a first portion length while characterization of MPEG level 4 [MP4] files can use a second portion length).

In some embodiments, the portion length to be characterized, per file format or per website, is specified by a parameter stored in a file within the content cache or in a file external to the content cache. In other embodiments, the portion length to be characterized, per file format or per website, may be specified by a parameter stored in a database within the content cache or in a database on a database server external to the content cache.

One consideration to be addressed with characterizing a portion of the requested content is that initial portions of video content often contain metadata that varies between otherwise identical copies of the video content. For example, a particular website may store and serve several copies of video content that are identical except for values set in certain metadata fields within those videos.

Unless these metadata value differences are comprehended in the content caching scheme, redundant content (e.g., several copies of the same video content, differing only in metadata values) may be stored in indices within the cache data structure, thereby reducing the efficiency of the content cache.

This problem may be avoided by setting the values of such metadata within the portion of the requested content to be characterized to known, consistent values, prior to inputting that portion of the requested content into the hash function. These metadata values are set by parsing the portion of the requested content for the identified metadata, replacing the existing metadata values in the portion of the requested content with the appropriate metadata values to form a modified version of the portion of the requested content, and using the modified version of the portion of the requested content for input to the hash algorithm.

For example, if certain websites (or all websites for that matter) were known to serve copies of video content that were identical except for the value of a particular metadata variable, that metadata variable could be parsed from the portion of the requested content to be characterized and set to zero (or some other predetermined value) for purposes of the characterization process, as illustrated in steps 506 and 508 of FIG. 5A (discussed below). In this example, two or more copies of video content that were stored separately on the web server and were identical except for the identified metadata variables would (after parsing) have identical portions of the requested content input to the hash algorithm. Accordingly, based on this common characterization, the copies of video content, differing only in this particular metadata value, could be cached within a single entry of the cache data structure. Thus, inefficiencies in content caching due only to variations in metadata values can be avoided.

Accordingly, as shown in step 506, the content received in step 504 is analyzed to determine whether that content contains metadata to modify. If the analysis performed in step 506 determines that the content received in step 504 contains metadata to be modified, the method continues to step 508, where the metadata is modified to reduce or eliminate content aliasing before the method continues to step 510. Returning to step 506, however, if the analysis performed in step 506 determines that the content received in step 504 did not contain metadata to be modified, the method continues directly to step 510.

In some embodiments, the metadata variables to be set and their corresponding appropriate values, for all websites or for particular websites, and for content in particular encoding formats, can be defined in a parameter file stored within the content cache or external to the content cache. Some embodiments parse the "sourcedata" metadata variable within FLV files, as a 32-bit integer value, and set it to zero for the reasons discussed above. In contrast, in some embodiments, other metadata fields are parsed and modified in files encoded in MP4 format.

In other embodiments, metadata variables to be parsed and their corresponding appropriate values, for all websites or for particular websites, and for files in encoded in particular formats or all formats, may be stored in a database within the content cache or in a database on a database server external to the content cache.

In general terms, an initial portion of requested content is obtained and parsed as follows: Upon receiving a content request from a user Internet-connected device, the optimization server requests a portion of the requested content from the web server, as a first type of characterization data, even though the content cache within the optimization server may conceivably hold a copy of that requested content. The web server responds to this request by transmitting the requested portion of the requested content to the optimization server, in original format.

Upon receiving the requested portion of the user-requested content from the web server, the optimization server parses the portion for metadata variables to be modified, if any, and modifies those values as directed, to create a modified portion of the requested content. Thereafter, the modified portion of the requested content is retained for use as an input to the hash algorithm. However, this modified portion of the requested content may be but one of several inputs to the hash algorithm.

A second type of characterization data may be the root domain name (or Internet Protocol ("IP") address) of the website that the user Internet-connected device requested content from. Using the root domain name or IP address of the website as an input to the hash algorithm may allow the content cache to distinguish between situations where the same video is served by two or more websites.

For example, users who create digital videos often post their videos on several video sharing websites (e.g., a first video sharing site and a second video sharing site). When another user requests that video from the first video sharing website, delivering a cached version of the video corresponding to the second video sharing website would be undesirable because the request was made to the first video sharing site. Without including the root domain name of the requested content within the characterization, aliasing content between websites (as illustrated by the example above) is possible. Therefore, the root domain name can be used to distinguish content in the content cache, thereby avoiding such aliasing. Accordingly, in step 510, the domain name is parsed from the URL of the requested content.

In the context of this discussion, the "root domain name" refers to the country code (e.g., ".co.uk") or top-level domain (e.g., ".com") in the URL and a single preceding domain field (e.g., "youtube" within "v22.lscache4.c.youtube.com"). For example, in the URL "video-4-11.rutube.ru", the root domain name (i.e., the top-level domain and single preceding domain field) would be "rutube.ru". In another example, the root domain name for "cache.youtube.co.uk" is "youtube.co.uk". In a third example, if a video sharing site employed an IP address for identifying itself, such as "213.174.148.153", rather than a URL, the IP address of that website ("213.174.148.153") would be used as an input to the hash algorithm.

In some situations, however, using the IP address from the URL of the requested content as a type of characterization data can lead to content aliasing and false misses in the content cache. Specifically, content providers that use a variety of IP addresses in the URLs for requested content can lead to content aliasing within a content cache when two or more URLs referring to the same content, stored at the same content provider, contain different IP addresses. Additionally, use of URLs containing two or more IP addresses to refer to the same content from the same content provider can lead to reduced caching performance because a request for a particular piece of content from a content provider may utilize a URL containing a first JP address, while the content cache may contain a cached copy of the requested content indexed under a second IP address. In this scenario, the content cache may determine that the content present in the content cache is not the same content as the content requested, based on two different IP addresses notwithstanding the associated content files being identical. Accordingly, in such a scenario, the content cache would forward the content request associated with the first IP address to a web server rather than serve the content stored in the content cache and indexed with the second IP address. Thus, in summary, content providers that use more than one IP address in URLs referencing their content can lead to content aliasing and/or reduced caching performance.

In some embodiments, content aliasing and caching performance reduction due to IP address differences among URLs associated with the same content can be reduced or eliminated by ignoring the IP address within the URL of requested content for certain content providers. In some embodiments, a file stored in memory on the content cache or external to the content cache may contain configuration information identifying which content providers for which the content cache should ignore IP addresses within URLs. In other embodiments, configuration information identifying which content providers for which the content cache should ignore IP addresses within URLs may be stored in a database, either within the content cache or external to the content cache. Notwithstanding the concerns noted above, and their associated solutions, parsing the root domain name or the IP address from the URL of the requested content can help to avoid aliasing content between sites, and can therefore be helpful for characterizing the requested content for indexing purposes.

A third input to the hash algorithm, as a form of characterization data, can be the content length of the requested content. One benefit of using the content length to characterize the requested video is to distinguish situations where differences between copies of the requested content exist but those differences are present beyond the portion of the requested content used as an input to the hash algorithm.

For example, two versions of a movie may be available for downloading on a video sharing website. One version may be a full-length copy of the movie. The second version may be shortened version, comprising only the first few minutes of the movie. Both versions may be longer than the length of the portion used as an input to the hash algorithm discussed earlier (e.g., the first 45 KB of the content, in some embodiments). Without using content length as an input to the hash algorithm, the two content files described above may alias when characterized and cached by the content cache. Thus, using content length as an input, the hash algorithm may reduce aliasing in the content cache, and can therefore be helpful when characterizing the requested content for indexing purposes. Accordingly, in step 512, the (full) length of the requested content is determined. The length sought in step 512 is the full length of the requested content, rather than the predetermined length of the fixed portion of the requested content sought in step 502. In some embodiments, the full length of the requested content is included in the requested portion of the user-requested content.

Some requested content does not, however, provide a content-length indicator as part of the content. In such situations, the content cache may cache the requested content without using the content length as an input to the hash algorithm, or may not cache the requested content at all. Generally, requested content without a content length indicator only occurs in rare instances. Therefore, in some embodiments, the content cache may opt not to cache such requested content. This default condition, however, can be overcome on a per-site basis by a setting in a configuration file stored on the content cache. Alternatively, in other embodiments, the default condition can be overcome through a setting stored in a database on the content cache or through a setting stored in a database on an external database server.

A fourth type of characterization data may be certain parameters or the content filename included within the URL of the requested content. In one scenario, websites may use parameters rather than the filename of the requested content to identify the requested content. In this scenario, the filename included in the URL may carry little or no informational value (and may be common for all requested content), so these websites may rely on parameter values to identify requested content. Therefore, in this scenario, parsing the parameters from the URL and using the parameters as inputs to the hash algorithm can help to uniquely identify the requested content. Accordingly, in step 514, any parameters present in the URL of the requested content are parsed from that URL.

Other websites may opt not to use URL parameters to identify requested content, relying instead on a unique filename within the URL to identify the requested content. In this scenario, the filename included in the URL may identify the requested content. Each scenario is discussed briefly, as follows.

For websites employing the URL parameters scenario, these parameters can take several forms. For example, URL parameters may involve a series of key-value combinations, initiated by a question mark and separated by ampersands, after the webpage within the URL. This format is common to web applications. For example, in the URL "http://v22.lscache4.c.youtube.com/videoplayback?ip=0.0.0.0& sparams=id%2Cexpire%2Cip%2Cipbits%2Citag %2Calgo- rithm%2Cburst%2Cfactor&algorithm=throttle-factor& itag=34&ipbits=0&burst=40&sver=3&expire= 1257984000&key=yt1&signature=6B08C4D879658DA 664689898E2A87D2AD9383FB2.14F95F7263FF8AD49 AB45D78BF740C34694C006&factor=1.25&id=bc90b0f 1bd492a64&", the key-value pairs of "itag=34", "key=yt1", and "id=bc90b0f1bd492a64" may be relevant for uniquely identifying the requested content.

In another example, parameters may be embedded as part of a subdirectory path within the URL. For example, in the URL "http://nyc-v53.pornhub.com/dl/a37364b7cea11d 5b814d0d0fecce6336/4afafa2b/videos/000/101/667/ 101667.flv?r=58", the "dl/a37364b7cea11d5b814d0d 0fecce6336/4afafa2b/videos/000/101/667" portion of the URL ordinarily represents subdirectories below the root directory of the web server. In this context, however, this portion of the URL may not represent subdirectories within the web server but may instead represent identifiers that, in combination, uniquely identify the requested content on the website. In this context, the filename included within the URL (e.g., "101667.flv") may or may not contribute to uniquely identifying the requested content. When either form of URL is received, the content cache can respond to such URLs by parsing the URL to identify and extract the parameter names and values (if values are present).

In some embodiments, a URL parser is configured to recognize both forms of parameter encoding described above, for certain websites, based on parameter encoding data and websites enumerated and stored in a configuration file within the content cache or external to the content cache. In other embodiments, the parameter encoding data and website names could be stored in a database, either within the content cache or on an external database server. Information in this configuration file may take the form of a URL parameter encoding format and a list of appropriate parameter names to extract from that format, for a particular website. From this information, for URLs utilizing name-value pairs, the URL parser may extract any enumerated parameter name and value from a URL whose format is also enumerated in the configuration file. From this information, for URLs utilizing the subdirectory format, the URL parser may extract any enumerated parameter names from the subdirectory path. Parameter names (and possibly parameter values if they exist) may be extracted from other URL encoding formats if the formats and variable names are enumerated in the configuration file, for specific websites. Any number of formats and websites may be enumerated and stored in the configuration file.

In some embodiments, the aforementioned encoding format for the configuration file may allow for parameter names or subdirectory names within the URL to appear in varying or inconsistent order, without affecting the URL parsing result. For example, in the YouTube™ example above, the "itag" and "id" parameters could appear in one URL with the "itag" parameter preceding the "id" parameter, and in another URL with the order of these parameters reversed, without preventing successful parsing of the URL.

In other embodiments, the parameter names and values to be identified, and the format of their encoding within a URL, for certain websites, can be configured through settings stored in a database on the content cache or in a database within a database server external to the content cache.

These examples illustrate the simplicity and the utility of parsing the URL for parameter names and values. In the context of content caching, however, parsing the parameter values from the URL of the requested content can be helpful for characterizing the requested content.

Alternatively, as mentioned above, some websites may not utilize URL parameters to uniquely identify requested content. These websites may instead uniquely identify requested content by the filename of the content within the URL. In the Pornhub™ example above, "101667.flv" is the filename within the URL and may be a unique identifier for the requested content. In some embodiments, the URL parser is configured to parse the URL of requested content for the filename portion of the URL, for certain websites, based on a setting within a configuration file stored on the content cache.

In step 516, the one or more types of characterization data are input to a hash function to determine an index to the content cache. In step 518, the method 500 concludes by receiving an output from the hash function based on the inputs to the hash function in step 516. This output from the hash function may be used as an index to a cache data structure, as previously discussed.

Another aspect of the discussion above pertains to the content cache delivering data of different quality levels to a requesting user Internet-connected device, based on conditions particular to that user Internet-connected device. In particular, a user who creates video content to be shared with others on the Internet may capture and upload that video in a resolution and format that is unoptimized for downloading. One example of such resolution is "1080p," a form of high definition video. Additionally, that high definition video file may not utilize any compression technology to reduce the time required for users to download the high definition file. For example, a user downloading a movie in 1080p format onto a Internet-connected device may find that the download takes an unacceptably long time to complete, due to network bandwidth limitations, and may also find that the Internet-connected device is not able to take full advantage of the high resolution content based on the low resolution screen on the Internet-connected device. Thus, users, network infrastructure providers, and website operators may find that files in original resolution and format are inconvenient to deal with.

One aspect of the approach discussed herein involves the content cache storing several versions of cached data, at different quality levels (i.e., optimization levels). For example, in some embodiments, the content cache may store a piece of cached content in original format and in one or more of high, medium, and low resolution formats. The high, medium, and low resolution formatted content may represent optimized versions of the original format content that have been created for user devices of varying capacity to receive and display such content. For example, a low resolution content file may be appropriate for a user on a Internet-connected device, based on reduced network communication capacity and reduced screen resolution for that device.

In an embodiment, these various versions of content may be identified and differentiated from the content in original format by appending a quality level indicator onto the filename of each version of the content. For example, if a piece of content was identified as "123ab", a filename for a version of that content stored in original format could be "123ab.O" (where "O" corresponds to "original") while filenames for high, medium, and low quality versions of the content could be "123ab.H", "123ab.M", and "123ab.L", respectively. Based on this naming convention, the content cache could recognize the quality level associated with each content file it stores, and could easily ascertain whether a version of requested content at a particular quality level was available.

In some embodiments, these various quality levels may constitute higher or lower resolution formats within the same encoding technology (e.g., MP4) and in other embodiments these various quality levels may represent content stored in different encoding formats. In some embodiments, both resolution and encoding format may vary between quality levels.

In some embodiments, as discussed above, the content cache generates and stores copies of requested content at appropriate quality levels on an as-needed basis. For example, if a user Internet-connected device makes a request for content from the content cache, and the content cache determines that the requested content is not stored in the content cache even in original format, the content cache acquires the requested content, in original format, from the web server. Thereafter, the content cache creates an optimized version of the requested content at a quality level that is appropriate for the user requesting that content. The content cache then stores the requested content in original format and also stores the optimized version of the requested content within the content cache. As discussed above, in some embodiments, versions of the requested content stored within the content cache may be identified and distinguished by appending a quality indicator to the filename of the content. Finally, the content cache transmits the optimized version of the requested content, to the user Internet-connected device.

Similarly, if a user Internet-connected device requests content from the content cache, and the content cache has the requested content stored in original format but the content cache does not have the requested content stored at a quality level that is appropriate to the user Internet-connected device, the content cache can optimize the original format content to create a copy of the requested content in the quality level that is appropriate for the user Internet-connected device without interacting with the web server. The content cache then stores the optimized copy of the requested content within the content cache and transmits the copy of the requested content to the requesting user Internet-connected device.

This approach to delivering requested content at varying quality levels avoids characterizing each optimized version of each piece of content in the content cache. Additionally, this approach avoids storing entries in the content cache index for each optimized version of the requested content. Therefore, the content cache efficiently serves content of varying quality levels, while avoiding redundant cache entries or unnecessary content characterization.

In other embodiments, the content cache may create optimized copies of requested content corresponding to all quality levels upon a first request for a particular piece of requested content at a particular quality level.

While embodiments discussed herein are directed to delivering content to Internet-connected devices, the embodiments discussed apply equally well to delivering content to other computing devices employing wired network connections to access video content referenced by dynamic URLs.

Although the embodiments disclosed above include generation of a cache index using as many as four types of characterization data that are input to a hash algorithm, the discussion herein readily lends itself to using fewer than all four types of characterization data as an input to the hash algorithm or to using other variants of the aforementioned components and techniques.

The invention claimed is:

1. A method for indexing content in a cache data structure within a content cache, the method comprising:
receiving a content request from a user Internet-connected device;
requesting, from a web server, a portion of content associated with the received content request;
identifying at least one characterization data for content associated with the received content request, wherein the at least one characterization data comprises the portion of content associated with the received content request; and
generating an index corresponding to content associated with the received content request by inputting the at least one identified characterization data into a hash function, wherein the generated index is used for identifying, in the cache data structure, an entry associated with the content by comparing the generated index to one or more index fields associated with one or more entries within the cache data structure.

2. The method of claim 1, wherein identifying at least one characterization data includes parsing a domain name from a Uniform Resource Locator (URL) associated with the received content request, wherein the domain name comprises a first part and a second part, wherein the first part comprises the top-level domain or country code within the URL and the second part comprises a portion of the URL that precedes the first part.

3. The method of claim 1, wherein identifying at least one characterization data includes parsing an IP address from a Uniform Resource Locator (URL) associated with the received content request.

4. The method of claim 3, wherein parsing an IP address from the URL associated with the received content request excludes the parsed IP address from the at least one characterization data if the parsed IP address is contained in a collection of IP addresses to exclude from the at least one characterization data.

5. The method of claim 1, wherein identifying at least one characterization data includes a length determination for the content associated with the received content request.

6. The method of claim 1, wherein identifying at least one characterization data includes parsing one or more parameters from a URL associated with the received content request.

7. The method of claim 1, wherein at least one metadata value associated with the requested portion of content associated with the content request received from the user Internet-connected device is set to a predetermined value prior to inputting the portion of content associated with the received content request into the hash function.

8. The method of claim 1, further comprising requesting, from the web server, content associated with the received content request, if the cache data structure does not contain an entry associated with the content.

9. The method of claim 1, wherein the portion has a predetermined length.

10. A non-transitory computer-readable storage medium on which is stored a set of instructions, which when executed, provides a method comprising:
receiving a content request from a user Internet-connected device;
requesting, from a web server, a portion of content associated with the received content request;
identifying at least one characterization data for content associated with the received content request, wherein the at least one characterization data comprises the portion of content associated with the received content request; and
generating an index corresponding to content associated with the received content request by inputting the at least one identified characterization data into a hash function, wherein the generated index is used for identifying, in a cache data structure, an entry associated with the content by comparing the generated index to one or more index fields associated with one or more entries within the cache data structure.

11. The non-transitory computer-readable medium of claim 10, wherein identifying at least one characterization data includes parsing a domain name from a Uniform Resource Locator (URL) associated with the received content request, wherein the domain name comprises a first part and a second part, wherein the first part comprises the top-level domain or country code within the URL and the second part comprises a portion of the URL that precedes the first part.

12. The non-transitory computer-readable medium of claim 10, wherein identifying at least one characterization data includes parsing an IP address from a Uniform Resource Locator (URL) associated with the received content request.

13. The non-transitory computer-readable medium of claim 12, wherein parsing an IP address from the URL associated with the received content request excludes the parsed IP address from the at least one characterization if the parsed IP address is contained in a collection of IP addresses to exclude from the at least one characterization data.

14. The non-transitory computer-readable medium of claim 10, wherein identifying at least one characterization data includes a length determination for the content associated with the received content request.

15. The non-transitory computer-readable medium of claim 10, wherein identifying at least one characterization data includes parsing one or more parameters from a URL associated with the received content request.

16. The non-transitory computer-readable medium of claim 10, wherein at least one metadata value associated with the requested portion of content associated with the received content request is set to a predetermined value prior to inputting the portion of content associated with the received content request into the hash function.

17. A system for indexing content, the system comprising:
a processor; and
a memory, wherein the memory is encoded with instructions that, when executed, perform steps comprising:
receiving a content request from a user Internet-connected device;
requesting, from a web server, a portion of content associated with the received content request;
identifying at least one characterization data for content associated with the received content request, wherein the at least one characterization data comprises the portion of content associated with the received content request; and
generating an index corresponding to content associated with the received content request by inputting the at least one identified characterization data into a hash function, wherein the generated index is used for identifying, in a cache data structure, an entry associated with the content by comparing the generated index to one or more index fields associated with one or more entries within the cache data structure.

18. The system of claim 17, wherein identifying at least one characterization data includes parsing a domain name from a Uniform Resource Locator (URL) associated with the received content request, wherein the domain name comprises a first part and a second part, wherein the first part comprises the top-level domain or country code within the URL and the second part comprises a portion of the URL that precedes the first part.

19. The system of claim 17, wherein identifying at least one characterization data includes parsing an IP address from a Uniform Resource Locator (URL) associated with the received content request.

20. The system of claim 19, wherein parsing an IP address from the URL associated with the received content request excludes the parsed IP address from the at least one characterization if the parsed IP address is contained in a collection of IP addresses to exclude from the at least one characterization data.

21. The system of claim 17, wherein identifying at least one characterization data includes a length determination for the content associated with the received content request.

22. The system of claim 17, wherein identifying at least one characterization data includes parsing one or more parameters from a URL associated with the received content request.

23. The system of claim 17, wherein at least one metadata value associated with the requested portion of the content associated with the received content request is set to a predetermined value prior to inputting the portion of content associated with the received content request into the hash function.

* * * * *